United States Patent [19]

Loveland

[11] 4,372,167
[45] Feb. 8, 1983

[54] FLOWMETER SYSTEM WITH IMPROVED LOOP GAIN

[75] Inventor: Robert S. Loveland, West Covina, Calif.

[73] Assignee: The Perkin-Elmer Corporation, Norwalk, Conn.

[21] Appl. No.: 224,724

[22] Filed: Jan. 13, 1981

[51] Int. Cl.³ .............................................. G01F 1/66
[52] U.S. Cl. .................................................. 73/861.28
[58] Field of Search ........... 73/861.27, 861.28, 861.29, 73/861.31; 307/511, 514, 527

[56] References Cited

U.S. PATENT DOCUMENTS

| 3,751,979 | 8/1973 | Ims | 73/861.27 |
| 3,796,962 | 3/1974 | Hekimian | 307/527 |
| 4,069,713 | 6/1924 | Gassmann | 73/861.28 |
| 4,164,865 | 8/1979 | Hall et al. | 73/861.28 |

Primary Examiner—Herbert Goldstein
Attorney, Agent, or Firm—S. A. Giarratana; E. T. Grimes; T. P. Murphy

[57] ABSTRACT

A flowmeter system having circuitry defining a path for confining the flow of a fluid medium therethrough, first and second transducers disposed along said flow path for generating and receiving acoustic compression waves in the fluid medium between the transducers, a phase lock loop receiver/transmitter system including a voltage controlled oscillator for adjusting the frequency of the acoustic compression waves to maintain the compression wave length constant, a phase detector for measuring the phase difference of the received acoustic compression waves relative to that transmitted and for producing a sum signal proportional to the sum of the measured phase differences to vary the output of said voltage controlled oscillator, circuitry for producing a difference signal proportional to the difference of the measured phase differences representing the direction and magnitude of the flow of the fluid medium as well as changes in its composition and an active filter in the loop for increasing the loop gain of the system.

10 Claims, 5 Drawing Figures

A XMT
B REC
C PHASE DET OUT
D PHASE DET OUT

FLOWMETER SYSTEM WITH IMPROVED LOOP GAIN

RELATED APPLICATIONS

U.S. application for patent entitled "Flowmeter System with a Synchronous Clock for Generation of Timing Signals" by R. S. Loveland, filed even date herewith, Ser. No. 224,783;

U.S. application for patent entitled "Flowmeter System With Ultrasonic Energy Improvement in Equillibration" by R. S. Loveland, filed even date herewith, Ser. No. 224,783;

U.S. application for patent entitled "Flowmeter System With Improved Dynamic Range" by R. S. Loveland, filed even date herewith, Ser. No. 224,725; and U.S. application for patent entitled "Flowmeter System With Digital Phase Shifter and Calibration" by R. S. Loveland, filed even date herewith, Ser. No. 224,723.

BACKGROUND OF THE INVENTION

This invention relates to acoustical flowmeter systems and is particularly directed to an improvement in the acoustical flowmeters of the type described and claimed in the U.S. Pat. No. 4,003,252 entitled "Acoustical Wave Flowmeter" by E. J. DeWath which issued Jan. 18, 1977 and the flowmeter system of the type described and claimed in the U.S. Pat. No. 4,164,865 entitled "Acoustical Wave Flowmeter" by L. G. Hall and R. S. Loveland which issued Aug. 21, 1979.

The invention of DeWath was directed to a flow meter having an unobstructed tubular wall thereby eliminating all impediments to the flow path of the fluid and eliminating all cavities in which debris might collect. The advantages of such a configuration is fully set forth in the DeWath patent. To measure flow of a selected fluid in the DeWath flowmeter, however, required a calibration for that particular fluid and required a recalibration if the flow of a different fluid was to be measured since the flowmeter was not responsive to changes in fluid species or densities.

The Hall and Loveland invention improved the DeWath flowmeter by providing a flowmeter that measured flow accurately regardless of changes in fluid composition or temperature and by providing a flowmeter with a means for determining a change in velocity of sound of the fluid being measured.

In order to accomplish this, the Hall and Loveland acoustical wave flowmeter system had two spaced apart crystal transducers in the wall of the flowmeter conduit (sometimes called a cavity) to produce ultrasonic acoustic compressions at selected frequencies in the fluid within the cavity. The transducers were alternately switched into a transmit and a receive mode to generate upstream and downstream transmitted and received signals with an automatic means to adjust the transmitted frequencies to compensate for changes in velocity of the acoustic compressions in the fluid caused by changes in fluid composition and temperature. The electronic circuitry involved in the Hall and Loveland flowmeter system include means for measuring and storing signals representing the phase difference between the transmitting transducer signal producing the acoustic compressions and the signal produced by the receiving transducer during each of two successive transmit/receive cycles. Circuit means were provided to determine the difference between the signals representing the two successive phase differences wherein the sign of the difference corresponds to the direction of the fluid flow and the magnitude of the difference corresponds to the rate of fluid flow through the flowmeter. Circuit means were also provided to add the two successive phase difference signals together to obtain a signal proportional to the velocity of sound in the fluid moving through the flowmeter. This latter signal indicated the change in composition of the fluid flowing through the meter.

The Hall and Loveland flowmeter system had a phase lock loop in the receiver/transmitter system which included, among other circuit components, a phase detector, voltage controlled oscillator (VCO) and a loop filter. This loop filter was a passive filter of the RC type for filtering the error voltage signal applied to the VCO which would respond by changing the transmitted frequency of the transducer. The problem encountered with this system is that, once calibrated to operate at a certain fluid density, a change in fluid density, for example, would cause the VCO to operate at a different frequency which means that the phase detector has a constant phase error to create the voltage to drive the VCO to a new frequency and thus the range of the phase detector for measuring the magnitude of flow was thus limited. For example, if the offset, or voltage applied to the VCO, were to change one volt, this would mean that the output of the phase detector would be required to work at a greater phase error difference from that for which the system was calibrated. Thus, with less phase error to work with, the flow measurement range is decreased, making the system more sensitive to changes in fluid flow or density which could cause the entire system to go out of range or into an out-of-lock mode.

This invention improves the prior system by requiring only a very small phase error to be detected by the phase detector in order to change the error signal applied to the VCO by a large amount thus improving the loop gain of the system. Accordingly, it is a primary object of this invention is to improve the loop gain of a phase lock loop circuit in a flow meter system.

SUMMARY OF THE INVENTION

The flowmeter system which meets the foregoing object comprises means defining a path for confining the flow of a fluid medium therethrough, first and second transducers disposed along said flow path for generating and receiving acoustic compression waves in the fluid medium between the transducers, circuit of the phase lock loop type having means for automatically adjusting the frequency of the acoustic compression waves to maintain the compression wave length constant in the fluid medium, means for measuring the phase difference of the acoustic compression waves transmitted upstream and downstream relative to that received and for producing a sum and difference signals dependent upon the difference between the transmit and receive two phases and transmitting said signal to said means for automatically adjusting the frequency of the acoustic compression waves, means for generating signals representing the direction and magnitude of the flow of the fluid medium as well as changes in the velocity of sound in the fluid medium, and an active filter including an operational amplifier whose output is connected to the input of the means for adjusting the frequency of the acoustic compression waves is that the gain of the phase lock loop so increased by the gain of the active filter thus reducing the need for large changes in phase difference to be detected by the phase detector before a change is augmented by the means for adjusting the frequency of the acoustic compression waves.

Other objects and advantages of this invention will become apparent to those skilled in the art after a study of the drawings and detailed description hereinafter.

DETAILED DESCRIPTION

Figure 1:
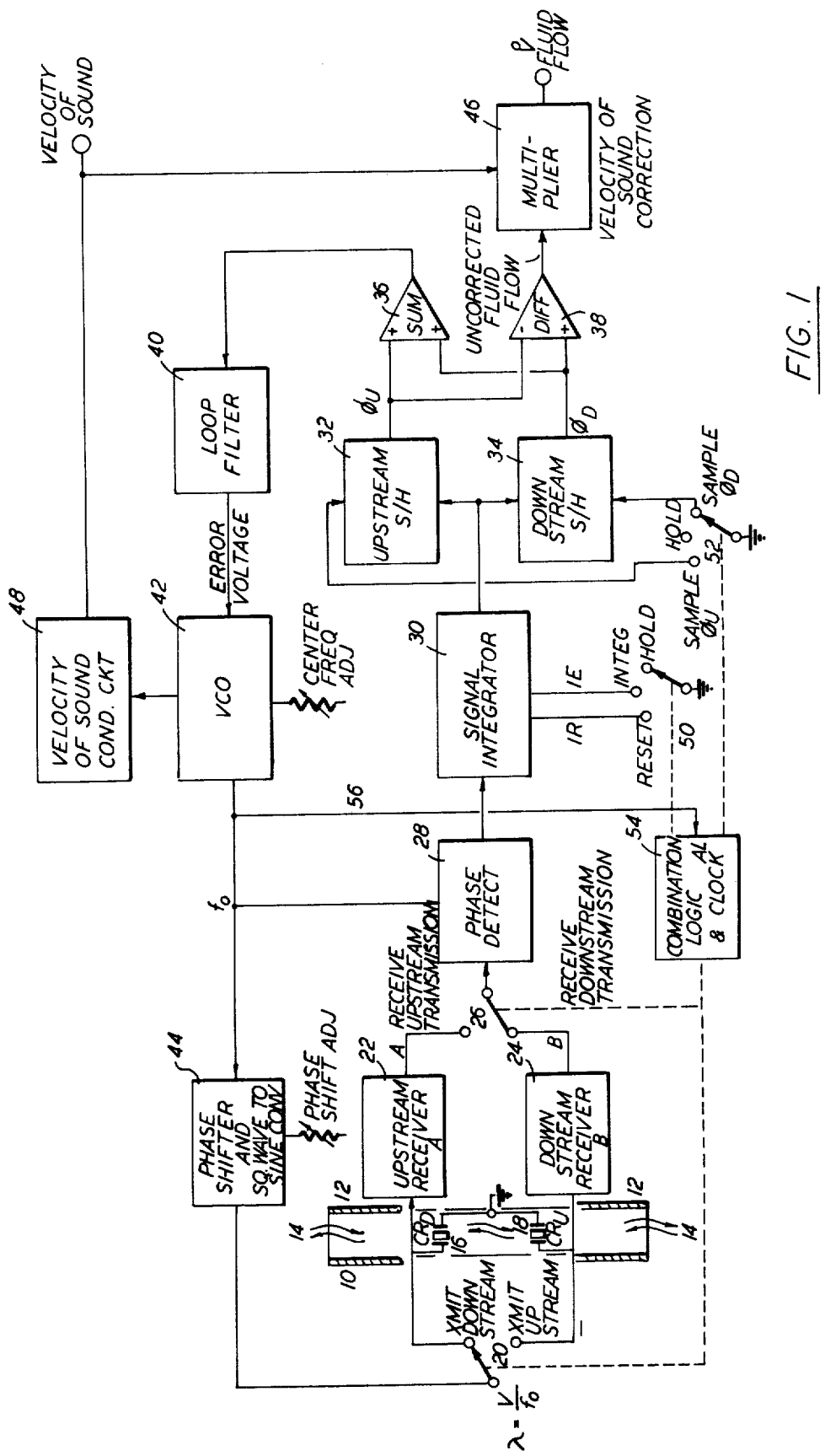
FIG. 1 is a simplified blank diagram of the flowmeter system of the invention.

FIG. 1 illustrates the flowmeter system of the present invention which includes a transducer assembly 10, shown in longitudinal section, which comprises a substantially cylindrical body having a central cylindrical opening, or bore 12, through which a fluid medium flows in both directions, as indicated by the arrows 14.

The transducer assembly is made generally in accordance with the description in the U.S. patent to DeWath, supra, and is provided with spaced apart cylindrical crystal transducers whose inner diameters are substantially coextensive with the cylindrical bore 12 so that the wall is substantially uniform with no obstructions or cavities to provide a place for particulate matter to collect or to provide an impediment for the flow of fluid therethrough. The purpose of the transducers is described in the DeWath patent and in the Hall and Loveland patent, supra.

While the Hall and Loveland patent also showed and described, in great detail, control circuitry for operating the crystal transducers to accomplish the desired results, for the purpose of this invention, this circuitry has been simplified into block diagrams and reference can be made to this patent if more detailed information on the operation of the circuit is thought necessary.

As can be seen in FIG. 1, the two ultrasonic crystal transducers, represented by crystals 16 and 18, also identified as $CR_D$ and $CR_U$, are alternately each connected to the transmission control circuitry via a switching mechanism 20. When one transducer is connected to the transmission circuitry via switching mechanism 20, the other transducer is in the receive mode the output of which in turn is connected via a second switching mechanism 26 to a phase detector 28, a signal integrator 30 and two sample-and-hold circuits 32 and 34, identified as upstream and downstream. The outputs of these two sample-and-hold circuits are connected to two operational amplifiers, one identified as a summing amplifier 36 and the other identified as a difference amplifier 38. The output of the summing amplifier 36 will indicate the velocity of sound and the output of the difference amplifier will indicate the magnitude and direction of the measured fluid flow. The output of the summing amplifier is connected to a loop filter 40 and to a voltage controlled oscillator 42 (VCO) which is connected back to the phase detector 28 and to a phase shifter and square-wave-to-sine wave converter 44. The phase shifter and converter 44 output is connected back to the first switching mechanism 20. Also like the summing amplifier, the output of the difference amplifier 38 is connected to the VCO 42 but through a multiplier 46 and a velocity of sound conditioning circuit 48. One output of the multiplier is the magnitude and direction of the fluid flow as stated above and the second output represents the relative velocity of sound. Shown connected by dotted lines are the first and second switching mechanisms 20 and 26 and two additional switching mechanisms 50 and 52 all under the control of a combinational logic and clock circuit 54. The circuit 54 alternates transmit and receive functions of the two crystal transducers 16 and 18, alternates the output of the upstream and downstream receivers 22 and 24, operates the integrator 30 between reset, integrate and hold functions and, finally, operates the upstream and downstream sample-and-hold circuits 32 and 34 through a sample, hold, and sample function.

As shown in this Figure, the ultrasonic crystals 16 and 18 are alternately switched into either the transmit or receive mode by the combinational logic circuit. Thus, while one crystal is receiving, the other crystal is transmitting.

For each transmit/receive cycle, the phase difference between the transmit signal and the received signal is detected by the phase detector 28. The average value is determined for each transmit/receive cycle by the integrator circuit 30 which goes through an integrate, hold and reset mode for each transmit/receive cycle. During each integrator hold period, the respective sample/hold circuit for the upstream phase and the downstream phase is ready to accept the new signal (sample mode) as data is available at the integrator output. The upstream and downstream sample/hold circuits are updated with new data at the end of each respective transmit/receive cycle and stores (holds) the information during the wait period.

In the differential amplifier 38, the stored values are then subtracted with the output indicating the direction and magnitude of the fluid flow. In addition, the same stored values are added together in the summing amplifier to determine if a common mode change has occurred in the fluid medium. A common mode change is caused by a change in the velocity of the ultrasound which, in turn, may be due to either temperature or fluid species change. The result is that the sum of the upstream and downstream data, held by the respective sample-and-hold circuits, changes in a manner which causes an error voltage signal at the voltage controlled oscillator (VCO) 42 input to change the transmit frequency in a direction which returns the wave length of the ultra-sound frequency is its original value thereby keeping the wave length constant.

The components of the control circuitry thus far described correspond to the control circuitry of the flowmeter system of the Hall and Loveland patent; it being understood that the foregoing is a simplification of the patented control circuitry. For example, the switching mechanism 20 in this disclosure is actually a combination of high speed transistorized switches comprised of transistors Q1 thru Q8 controlled from the clock source by pulses X,Y Q3 and $\overline{Q3}$ applied to their respective inputs, switching mechanism 26 are transistors Q9 and Q10 with pulses A and B applied to their respective inputs operation of the logic and clock source but otherwise the block diagrams correspond to the patented circuitry, etc. Other switching mechanisms exist in the circuitry of the patent through the operation of the clock source but otherwise the block diagrams correspond to the patented circuitry. It is understood that the other switching mechanisms were shown here to illustrate the operation of the circuitry in the block diagram only.

As hereinabove, stated, this invention improves the patented system by increasing the loop gain (gain is a function of components in the loop, eg, transducers, loop filter, integrator, VCO, etc), and this is accomplished by incorporating a new and improved loop filter into the flowmeter system. However, in order to understand the significant improvement in loop gain the prior art loop filter as used in the patented system will first be described. In connection with this, attention is now directed to FIGS. 2,3, and 4, where FIG. 2 is the prior art passive loop filter, FIG. 3 illustrates the phase detector input (transmitted and received) and output pulses, and FIG. 4 illustrates the improved active loop filter comprising this invention as part of the flowmeter system.

Figure 2:
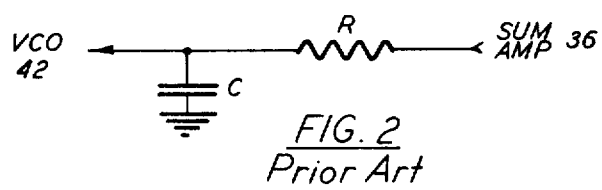
FIG. 2 is the prior art passive filter.

As illustrated in FIG. 2, and as described in the Hall and Loveland patent, output pulses from the summing amplifier 36 are applied to the passive loop filter 40 which comprises a one megohm resistor R and a one micro-farad compacitor C connected in a conventional manner with the output therefrom applied directly to the input of the VCO 42. This filter, being passive, simply filters the input signal with no gain so that its output is simply a filtered voltage signal of essentially the same amplitude as the input pulse.

Figure 3:
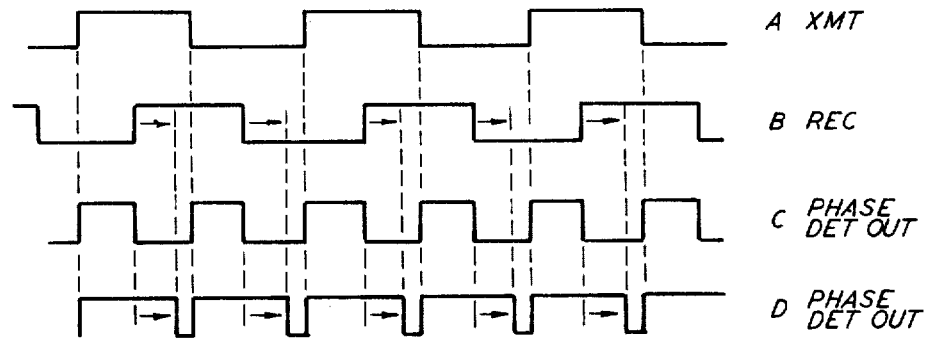
FIG. 3 illustrates the received, as transmitted and phase detected pulses of the phase detector.
Figure 4:
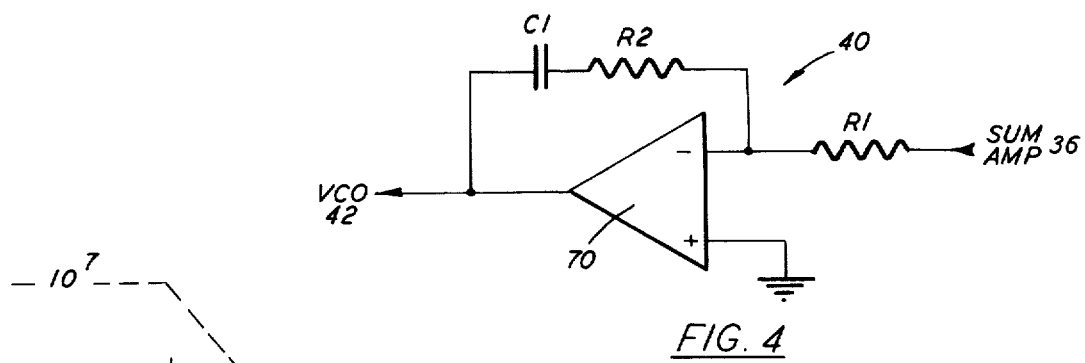
FIG. 4 illustrates the circuit for the active filter of this invention.

To understand the need to improve loop gain, attention is now directed to FIG. 3 showing the timing pulses where line A represents the transmit pulses applied to one transducer generating the acoustic compression waves in the fluid medium and line B represents the received pulses received from either the upstream or downstream receiver and applied to the phase detector 28 under a no flow condition with a fluid for which the instrument has been calibrated. Thus, the received pulses are 90° out of phase with the transmitted pulses under a calibrated ideal condition. Line C represents the output of the phase detector under such a condition. Note the pulses in line C are ½ the length of the pulses in lines A and B at twice the frequency of the received pulses.

However, in use, when the summing amplifier 36 indicates a change in density of the fluid in the cavity, an error signal is applied to the VCO 42 so as to change the frequency of the transmit pulses applied to the transmitting transducer so that the wavelength of sound through the newly detected changed fluid remains the same. For example, as seen in line D of FIG. 3, considering the transmitted frequency which has changed due to a fluid density change, as a constant, the received pulses have moved in phase relative to the transmitted pulses, as for example 30° on one side and 60° on the other side from its original position of 45° on both sides. This means that when the detected phase offset is as shown in line D, the system can only respond to a further shift of 30° (due to a flow signal) in the direction which is already at 60° before the maximum limit of 90° is reached before the system goes to an out-of-lock mode—an inoperative mode. Translating this into fluids being measured, for example, if the original instrument was calibrated to respond to a change of 6 liters per second in its original calibration, the system would only be capable of measuring 4 liters per second since ⅔ (60°-45°) of phase detector range has been used to change the VCO frequency. Thus, a change of flow of greater than 4 liters per second in one direction would throw the system into an out-of-lock mode.

What this means, is that, in the prior art, in order to have a change in phase error signal of one volt, wave form D would change its duty cycle. The duty cycle of wave form C is 50 percent and the signals entering the phase detector are exactly 90° (when calibrated) out of phase, but if the fluid density is changed, then the duty cycle of the wave form must change. In changing the duty cycle of this wave form, however, the range in one direction is not the same as the range in the other. Thus, a sudden change of fluid in the wrong direction would cause the system to go into an inoperative mode.

Explaining the operation of the flowmeter system in another way, and to thus inferentially explain the importance of this invention, attention is directed back to FIG. 1 where the upstream and downstream sample-and-hold circuits 32 and 34 have their outputs, respectively, identified as $\phi_U$ and $\phi_D$, applied to the sum and difference amplifiers 36 and 38.

Turning now to FIG. 4, there is shown an active filter 40 which comprises a resistor R1 connected to the inverting input of an operational amplifier 70 and also connected through a second resistor R2 to a capacitor C1 which, in turn, is connected to the output of the operational amplifier. The noninverting input to the amplifier is grounded. The active filter is essentially an integrator, where C1 is the integrating component, R1 defines the unity gain crossover frequency and R2 is used for loop stability. Thus, the voltage applied to this active filter 40 is multiplied several hundred thousand times according to, or equal to, the gain of the operational amplifier. It becomes apparent, then, that a minute change in density will cause a large error signal to be applied to the VCO to change the transmit frequency. Thus, the 50% duty cycle wave form remains virtually unchanged and the dynamic range of the system is substantially uneffected.

Figure 5:
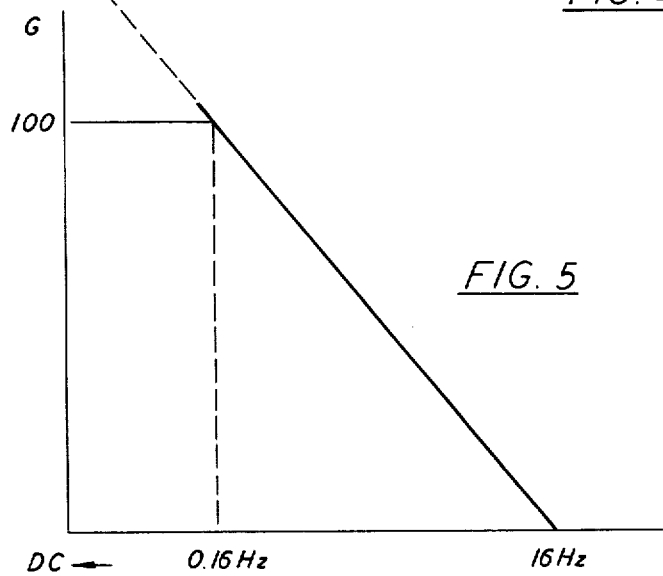
FIG. 5 illustrates the total open loop gain of the system by incorporating this invention.

How this increases the loop gain by a tremendous amount is explained further in connection with FIG. 5 which represents the open loop transfer function of the phase lock loop system—gain versus frequency. As can be seen, as frequency is increased, the 3 db roll off point is reached at about 0.16 hertz and it continues to roll off until it reaches about 16 hertz. With the open loop gain of this system at about 100, the error voltage required to change the VCO frequency, is relatively high. This is true regardless of whether the phase detector is the one of the prior art or the new phase detector which is the subject matter of the currently filed U.S. patent application Ser. No. 224,725, supra.

However, by replacing the passive filter of the prior art with the active loop filter, this loop gain increases by at least a hundred thousand, that is, the gain of the amplifier (shown by the dash line below 0.16 hertz point) times the gain of the loop provides a total open loop gain as a product of these two or 100,000×100. Thus, again the system maintains the 50 percent duty cycle wave form and the dynamic range of the system remains substantially unaffected by the change in flow or fluid density.

It should be apparent from the foregoing that this invention may be incorporated into the circuitry of the Hall and Loveland patent, supra, to improve its performance, or may be incorporated in circuitry improved by the incorporation of any one or all of the inventions identified under RELATED APPLICATIONS. supra into a circuit to improve the performance of such circuitry. If the invention of the application Ser. No. 224,783 is not used, of course, line 56, shown herein, would be omitted.

What is claimed is:

1. A flowmeter system of the phase lock loop type comprising, in combination:
    transducer means for transmitting acoustic compression waves upstream and downstream in a fluid flowing in a path;
    circuit means for measuring the phase difference between the transducer means in the fluid flow path of acoustic compression waves transmitted upstream and circuit means for measuring the phase difference between said transducer means in the fluid flow path of the acoustic compression waves transmitted downstream;
    circuit means for producing a difference signal dependent on the difference between the two phase differences, the magnitude and sign of which being directly related to the instantaneous fluid flow rate and its direction;
    circuit means for producing a sum signal representing the sum of the two phase differences;
    circuit means for automatically adjusting the frequency of the acoustic compression waves to a frequency where a fixed wavelength distance, in the fluid flow medium, occurs across the path between the transducer means; and
    active filter means connected between said summing means and automatic frequency adjusting means for filtering and increasing the amplitude of the sum signal so that relatively small difference signals produce large signals at said automatic frequency adjusting means to increase the loop gain of the system.

2. The flowmeter system as claimed in claim 1 wherein said active filter means includes an operational amplifier connected as an integrator.

3. The flowmeter system as claimed in claim 1 where said system includes summing means for producing a sum signal representing the sum of the two phase differences and wherein said active filter is connected between summing means and said automatic frequency adjusting means.

4. A flowmeter system for measuring a fluid along a path comprising in combination:
    means defining a path for confining a fluid flow;
    a first and second transducer disposed along said path;
    a transducer control circuit coupled to said first and said second transducer to cause said first transducer to produce first acoustic compressions in the fluid and said second transducer to produce a first received signal when said first acoustic compressions are sensed thereby during a first transmit-receive cycle and to cause said second transducer to produce second acoustic compressions in the fluid and said first transducer to produce a second received signal when said second acoustic compressions are sensed thereby during a second transmit/receive cycle;
    said control circuit including:
    means to switch from said first to said second transmit-receive cycle;
    first measurement means to measure a first phase difference comprising the phase difference between the first acoustic compression produced by said first transducer and said received signal produced by said second transducer during each said first transmit-received cycle;
    second measurement means to measure a second phase difference comprising the phase difference between the second acoustic compression produced at said second transducer and said second received signal produced by said first transducer during each said second transmit/receive cycle;
    difference means responsive to said first and said second measurement means to produce a difference signal whose magnitude equals the difference between one said first phase difference and one said second phase difference wherein the magnitude of said difference signal is directly related to the instantaneous fluid flow rate and the algebraic sign of said difference signal represents the direction of fluid flow along the path;
    means to automatically adjust the frequency of the acoustic compressions produced by each said transducer to a frequency where a fixed wavelength distance, in the fluid flow medium, occurs across the distance of either said transducer, thereby maintaining operation at the acoustic resonance to maximize the magnitude of the received signal produced at the other transducer so that said difference signal output is insensitive to the velocity of sound in the fluid;
    summing means responsive to said first and second measurement means to produce a sum signal;
    said automatic frequency adjusting means being responsive to said sum signal, and
    an active filter means between said summing means and said automatic frequency adjusting means to magnify the sum signal so that a minute sum signal will cause said automatic adjustment means to respond thereby increasing the gain of the system.

5. The flowmeter system as claimed in claim 4 wherein said active filter includes an operational amplifier connected to operate as an integrator.

6. The flowmeter as claimed in claim 4 wherein said active filter includes a capacitor and resistance in series with an operational amplifier in parallel with said capacitor.

7. A phase lock loop flowmeter system for measuring a fluid along a path comprising, in combination:
    a tubular body defining a path for confining fluid flow;
    an adjustable oscillator for producing a signal at an adjustable frequency;
    a switching circuit to alternately switch said signal into an upstream signal and a downstream signal;
    a first transducer means and a second transducer means being disposed in spaced relation to each other along said tubular body, said first transducer means responsive to said upstream signal and said second transducer means responsive to said downstream signal, said first transducer means producing upstream acoustic compressions in the fluid responsive to said upstream signal and said second transducer means responds to said upstream acoustic compressions by producing an upstream received signal, said second transducer means producing downstream acoustic compressions in the fluid responsive to said downstream signal and said first transducer means responds to said downstream acoustic compressions by producing a downstream received signal;

a phase detector responsive to each said upstream signal and to each said upstream received signal to produce an upstream phase difference which comprises the phase difference between said upstream signal and said upstream received signal, said phase detector also being responsive to each said downstream signal and to each said downstream received signal to produce a downstream phase difference which comprises the phase difference between said downstream signal and said downstream received signal;

means to produce the sum of one said upstream phase difference and one said downstream phase difference;

means responsive to the sum of one said upstream phase difference and one said downstream phase difference to adjust the fequency of said adjustable oscillator to a frequency where a fixed wavelength distance occurs across the distance between said transducer when responding to said sum; and active filter means connected between the means to produce the sum and the means responsive to the sum to amplify the output of the means to produce the sum so that small sums will be amplified causing the means responsive to the sum to respond to said amplified small sums to thereby increase the loop gain of the system.

8. A flowmeter system of the phase lock loop type comprising, in combination:

transducer means for transmitting acoustic compression waves upstream and downstream in a fluid flowing in a path;

circuit means for measuring the phase difference between the transducer means in the fluid flow path of acoustic compression waves transmitted upstream and circuit means for measuring the phase difference between said transducer means in the fluid flow path of the acoustic compression waves transmitted downstream;

circuit means for producing a difference signal dependent on the difference between the two phase differences, the magnitude and sign of which being directly related to the instantaneous fluid flow rate and its direction;

circuit means for producing a sum signal representing the sum of the two phase differences;

circuit means for automatically adjusting the frequency of the acoustic compression waves to a frequency where a fixed wavelength distance, in the fluid flow medium, occurs across the path between the transducer means; and active filter means connected between said summing means and automatic frequency adjusting means and responsive to the sum signal to maintain the dynamic range of the system substantially unaffected by a change in fluid flow or fluid density.

9. A flowmeter system comprising:

means defining a path for confining the flow of a fluid medium therethrough, first and second transducers disposed along said flow path and connected to circuitry including a voltage controlled oscillator and a switching means for alternately generating and receiving upstream and downstream acoustic compression waves in the fluid medium between the transducers and for generating a signal in response to the received acoustic compression waves, said circuitry being of the phase lock loop type and further including, phase detector means for measuring the phase difference, if any, between the transmitted acoustic compression waves and the received acoustic compression waves, means connected to said phase detector means for producing a sum signal and a difference signal dependent upon the measured phase difference and transmitting said sum signal to said voltage controlled oscillator for adjusting the frequency of the acoustic compression waves to maintain the length of said waves constant in the fluid medium, said circuitry then operating at the adjusted frequency for flow measurement, means responsive to said difference signal for generating signals representing the direction and magnitude of the flow of the fluid medium, and an active filter means including a high gain operational amplifier whose input is connected to said means for producing said sum signal and whose output is connected to the voltage controlled oscillator to reduce the amount of sum signal required to adjust the oscillator output frequency thereby maintaining a constant full scale range of flow measurement capability which would otherwise be diminished by the larger amount of sum signal present in the system.

10. A flowmeter system comprising:

means defining a path for confining the flow of a fluid medium therethrough, first and second transducers disposed along said flow path and connected to circuitry which includes a voltage controlled oscillator and a switching means for alternately generating and receiving upstream and downstream acoustic compression waves in the fluid medium by and between the transducers and means for generating a signal in response to the received acoustic compression waves, said circuitry being of the phase lock loop type and further including, phase detector means for measuring the phase difference between the transmitted acoustic compression waves and the received acoustic compression waves, means connected to said phase detector means for producing a sum signal and a difference signal dependent upon the measured phase difference, said sum signal being transmitted to said voltage controlled oscillator for adjusting the frequency of the acoustic compression waves to maintain the length of said waves constant in the fluid medium as a measure of fluid density, said circuitry then operating at the adjusted frequency for flow measurement, means responsive to said difference signal for generating signals representing the direction and magnitude of the flow of the fluid medium, and an active filter means connected between said means for producing said sum signal and the voltage controlled oscillator to reduce the amount of sum signal required to adjust the oscillator output frequency thereby maintaining a constant full scale range of flow measurement capability at the measured fluid density.

* * * * *